United States Patent
Saxe et al.

(10) Patent No.: US 6,553,362 B2
(45) Date of Patent: Apr. 22, 2003

(54) CASE-REDUCED VERIFICATION CONDITION GENERATION SYSTEM AND METHOD USING WEAKEST PRECONDITION OPERATOR EXPRESSED USING STRONGEST POSTCONDITION OPERATORS

(75) Inventors: James Benjamin Saxe, Palo Alto, CA (US); Charles Gregory Nelson, Palo Alto, CA (US); David Luke Detlefs, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/907,327

(22) Filed: Jul. 16, 2001

(65) Prior Publication Data

US 2002/0083418 A1 Jun. 27, 2002

Related U.S. Application Data

(60) Provisional application No. 60/218,305, filed on Jul. 14, 2000.

(51) Int. Cl.[7] .................................................. G06N 5/00
(52) U.S. Cl. .............................. 706/47; 717/9; 717/152; 717/158
(58) Field of Search ................................ 706/47; 717/9, 717/152, 158

(56) References Cited

U.S. PATENT DOCUMENTS 5,999,735 A * 12/1999 Radigan ...................... 717/152
6,381,739 B1 * 4/2002 Breternitz, Jr. et al. ......... 717/9
6,463,582 B1 * 10/2002 Lethin et al. ................ 717/158

OTHER PUBLICATIONS

Mark N. Wegman; F. Kenneth Zadeck, Constant Propagation With Conditional Branches, ACM Transaction on Programming Languages and Systems (TOPLAS), vol. 13, Issue 2 (Apr. 1991), pp. 181–210.*

* cited by examiner

Primary Examiner—Wilbert L. Starks, Jr.
(74) Attorney, Agent, or Firm—Gary S. Williams; Pennie & Edmonds LLP

(57) ABSTRACT

The instructions in a computer program are converted into a form of weakest precondition so as to produce a verification condition that is to be evaluated by a theorem prover. In generating the weakest precondition, labels are introduced for values of variables at control join points. In two preferred embodiments, the computer program is converted into a set of guarded commands prior to the application of weakest precondition operators. In one embodiment, as part of the process of generating the verification condition, assignment commands that assign values to variables are removed from the program through use of a "dynamic single assumption" technique. In another embodiment, the weakest precondition is expressed in terms of strongest postconditions. In both embodiments, a simplified verification condition is produced in which duplications of sets of instructions following a choice operator is avoided.

23 Claims, 5 Drawing Sheets

CASE-REDUCED VERIFICATION CONDITION GENERATION SYSTEM AND METHOD USING WEAKEST PRECONDITION OPERATOR EXPRESSED USING STRONGEST POSTCONDITION OPERATORS

This application claims priority to U.S. provisional patent application No. 60/218,305, filed Jul. 14, 2000, entitled "Case-reduced Verification Condition Generation System And Method," which is hereby incorporated by reference in its entirety.

FIELD OF THE INVENTION

The present invention relates generally to tools that automatically verify, using static checking techniques, the correctness of a computer program with respect to predefined criteria, and particularly to a tool that derives verification conditions from a computer program source code. In particular, the present invention relates to the simplification of the verification condition to avoid repeated evaluation by a theorem prover of a subexpression in the verification condition that corresponds to a portion of the computer program that is common to two or more alternative paths through the program.

BACKGROUND

The purpose of a computer program verification system is to analyze a given computer program to determine whether or not it has certain desirable properties. Verification systems can also be used to analyze hardware components. A typical verification system works by generating a verification condition from a given behavioral design, and then evaluating the verification condition with a theorem prover. The verification condition is a mathematical formula. Ideally this formula is valid if and only if the original source program is free of certain kinds of errors.

The verification condition (VC) is analyzed by a theorem prover that attempts to prove the "theorem" that the VC is true. When the theorem prover is unable to prove that the VC is true, it preferably provides a counter-example, which specifies at least one condition for which the VC is false. For example, if the VC is x+y>x, then a counter-example is $y \leq 0$.

In general, theorem proving is difficult and may consume exorbitant computer resources. Many verification conditions are not solvable in general. Also, the size of the VC may grow exponentially with the size of the computer program from which it is derived. Another circumstance is that two mathematical formulae may be logically equivalent but one may be harder to prove than the other. Overall, significant computer resources may be expended in theorem proving, even when the computer program corresponding to the VC is not unusually complex or long.

The theory behind VC generation and theorem proving derives from that branch of mathematics known as Logic. Principles underlying VC generation also underlie the general theory of the construction of computer programs and the operation and implementation of programming languages. A theoretical treatment of VC generation in the prior-art can be found in E. W. Dijkstra, *A Discipline of Programming*, Prentice-Hall, (1976); and in C. A. R. Hoare, "An Axiomatic Basis for Computer Programming," *Communications of the Association for Computing Machinery*, 12(10):576–83 (October 1969), both of which are hereby incorporated by reference as background information.

Several program verification systems exist in the prior art. Examples include: *A Program Verifier*, J. King, Ph.D. thesis, Carnegie-Mellon University (1969) in which a system, called Effigy, used Symbolic execution to generate verification conditions; L. P. Deutsch, *An Interactive Program Verifier*, Ph.D. thesis, Univ. Calif., Berkeley, (1973), the first program verifier to use an interactive theorem prover; D. Luckham and N. Suzuki, *Automatic Program Verification V: verification-oriented rules for arrays, records and pointers*, Stanford Artificial Intelligence Laboratory Memo AIM-278, (March 1976). The last of these, the Stanford Pascal Verifier, used "Hoare Logic" to generate VC's.

A major contribution to the intensivity of effort in applying the theorem prover is in case-splitting situations, i.e., where choices arise in the program. For example, an "if . . . then . . . else" construct in a computer program provides two alternative, i.e., a pair of, conditional program execution paths, more generally called a choice. Other examples of program constructs that result in a choice are a loop with a loop termination condition, and a conditional branch. All of the aforementioned systems produced VC's with enormous numbers of cases for programs containing a sequential composition of a significant number of alternative choice constructs.

When a computer program has the structure $(S_1 \square S_2) S_3$ (wherein the $\square$ operator represents choice), the corresponding VC generated by methods in the prior art will normally include two instances of an expression corresponding to $S_3$, wherein one instance is combined with an expression corresponding to $S_1$ and another instance is combined with an expression for $S_2$. More generally, each choice in a computer program will approximately double the size of the resulting VC because of the duplication of $S_3$, and will thereby double the amount of work to be performed by the theorem prover to evaluate the VC. Thus, the presence of multiple choices within a computer program will typically cause the complexity of the corresponding VC to increase exponentially when using the methods of the prior art.

Therefore it is a goal of the present invention to generate a VC that is easier for the theorem prover to evaluate and which is smaller in size than the normal VC for the computer program for which the VC is being generated. None of the aforementioned program verification systems featured a solution to the problem, as addressed by the present invention.

SUMMARY OF THE INVENTION

The present invention relates to the generation of a verification condition (VC) from a computer program source code that comprises a collection of program statements.

Accordingly, the present invention involves a method of generating a verification condition for a computer program that comprises a collection of program statements and that contains a pair of conditional program execution paths preceding a control join point and an expression following the control join point, the method comprising: applying at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

Although a computer program can be transformed directly into a VC and take advantage of the benefits of the present invention, the overall process is facilitated by introducing an intermediate step, whereby the computer program is first converted into an intermediate form comprising "guarded commands." The preferred input to the VC generator is then a set of guarded commands. In principle, a program written in any computer language can be converted this way.

In a preferred embodiment, the VC generation algorithm is the computation of a weakest precondition. In one embodiment, the weakest precondition of the set of guarded commands is computed and assignment commands (which assign values to variables) are removed from the program through use of the "dynamic single assumption" technique that transforms assignment commands into program assumptions. In another embodiment, the weakest precondition is expressed in terms of strongest postconditions. The commonality between the embodiments is that labels are introduced for the values of variables at control join points and that duplication or near duplication in the VC of subexpressions derived from the expression following the control join point is avoided.

The present invention includes a method of generating a verification condition for a computer program that comprises a collection of program statements and that contains a pair of conditional program execution paths preceding a control join point and an expression following the control join point, the method comprising: when the program statements in the computer program include at least one assignment statement, transforming the at least one assignment statement into an assume command, wherein the transforming includes mapping a variable that is assigned a value by the at least one assignment statement into an expression denoting a value of the variable after the at least one assignment statement; and applying at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths. A method according to the present invention also preferably comprises passing the verification condition to a theorem prover and determining whether or not the verification condition is valid.

In a preferred embodiment, the method of the present invention additionally comprises expressing the weakest precondition operator in terms of at least one strongest postcondition operator.

Accordingly the present invention additionally comprises a computer readable medium for use in conjunction with a computer system, the computer readable medium comprising a computer readable storage medium and a computer program mechanism embedded therein, the computer program mechanism comprising: instructions for generating a verification condition for a computer program that comprises a collection of program statements and that contains a pair of conditional program execution paths preceding a control join point and an expression following the control join point; instructions for determining when the program statements in the computer program include at least one assignment statement, and, instructions for transforming the at least one assignment statement into an assume command, wherein the transforming includes mapping a variable that is assigned a value by the at least one assignment statement into an expression denoting a value of the variable after the at least one assignment statement; and instructions for applying at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

The present invention also includes a computer readable medium for use in conjunction with a computer system, the computer readable medium comprising a computer readable storage medium and a computer program mechanism embedded therein, the computer program mechanism comprising: instructions for generating a verification condition for a computer program that comprises a collection of program statements and that contains a pair of conditional program execution paths preceding a control join point and an expression following the control join point; instructions for applying at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

The present invention further includes a computer readable medium that comprises instructions for computing at least one precondition operator in terms of a weakest precondition operator expressed by at least one strongest postcondition operator.

The present invention additionally includes an apparatus for generating a verification condition for a computer program that comprises a collection of program statements and that contains a pair of conditional program execution paths preceding a control join point and an expression following the control join point, the apparatus comprising: a memory containing the computer program, an operating system and at least one processor configured to execute mathematical operations on the computer program, wherein the computer processor: when the program statements in the computer program include at least one assignment statement, transforms the at least one assignment statement into an assume command, and includes mapping a variable that is assigned a value by the at least one assignment statement into an expression denoting a value of the variable after the at least one assignment statement; and applies at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

The present invention also includes an apparatus for generating a verification condition for a computer program that comprises a collection of program statements and that contains a pair of conditional program execution paths preceding a control join point and an expression following the control join point, the apparatus comprising: a memory containing the computer program, an operating system and at least one processor configured to execute mathematical operations on the computer program, wherein the computer processor: applies at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

The apparatus of the present invention also includes a computer processor that computes at least one precondition operator in terms of a weakest precondition operator expressed as at least one strongest postcondition operator.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The present invention provides a method of generating a VC that is simpler and easier for a theorem prover to evaluate than a VC generated using methods in the prior art. The VC generated using the present invention takes advantage of situations where a single evaluation of an expression by the theorem prover may be valid for multiple computational contexts.

The VC has a branching structure that governs its evaluation by the theorem prover. By reducing the number of branches in accordance with the present invention, repeated evaluation of various subexpressions is eliminated or reduced. In some situations, repeated evaluations of a subtree, representing a postcondition for two conditional program execution paths of the computer program, may nevertheless be required because of differences in the assumptions that apply to evaluation of the subtree for each of the alternate execution paths. But in many situations the theorem prover will need to evaluate a subtree corresponding to the postcondition only once.

As used herein, a postcondition and a precondition are both examples of predicates. As understood by one skilled in the art, a predicate is a function whose result represents the truth or falsehood of some condition. A predicate transformer is a characterization of the semantics of a program or program statement as a function from predicates to predicates.

Figure 1:
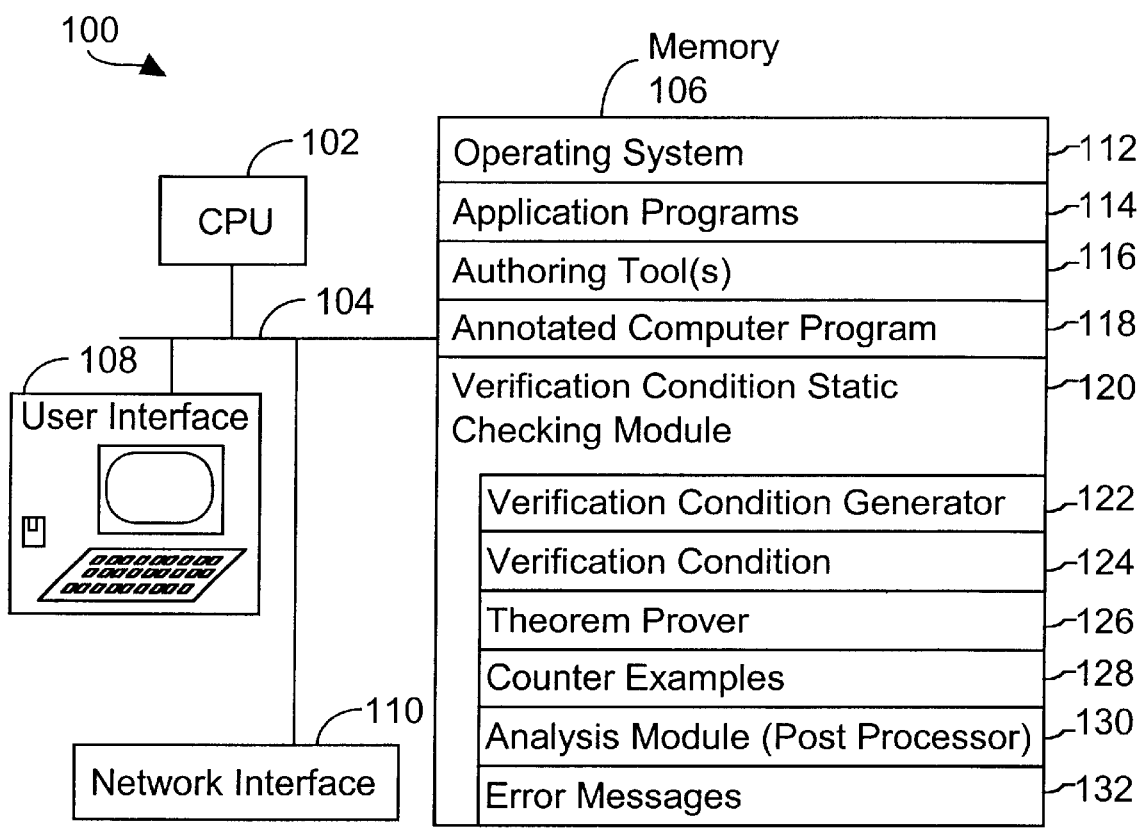
FIG. 1 is a block diagram of a programmed general purpose computer according to an embodiment of the Verification Condition Static Checking system.

Referring to FIG. 1, the present invention may be implemented using a programmed general-purpose computer system 100. The computer system 100 includes: (a) one or more data processing units (CPU's) 102; (b) memory 106, which will typically include both high speed random access memory as well as non-volatile memory (such as one or more magnetic disk drives); (c) a user interface 108; (d) a network or other communication interface 110 for communicating with other computers as well as other devices; and (e) one or more communication busses 104 for interconnecting the CPU(s) 102, memory 106, user interface 108, and network interface 110.

The computer system's memory 106 stores procedures and data, typically including:

- an operating system 112 for providing basic system services;
- application programs 114, such as user level programs for viewing and manipulating images;
- one or more authoring tools 116, for assisting with the writing of computer programs; and
- an annotated computer program 118 that comprises a collection of program statements, representing a computer program to be analyzed by a verification condition static checking module 120. It is understood that the system and method of the present invention is also applicable to fragments of computer programs, for example, individual or several of the procedures, functions, subroutines, modules, or applets of which a computer program may be comprised.

The verification condition static checking module 120 preferably includes:

- a verification condition generator 122, which generates as its output a verification condition 124;
- a theorem prover 126 that analyzes the verification condition and optionally generates one or more counterexamples 128 when it is unable to prove the verification condition; and
- an analysis module 130 that performs post processing on the counterexamples 128 generated by the theorem prover 126, and when an error or potential error in the computer program 118 is detected, produces one or more error messages 132.

Figure 2:
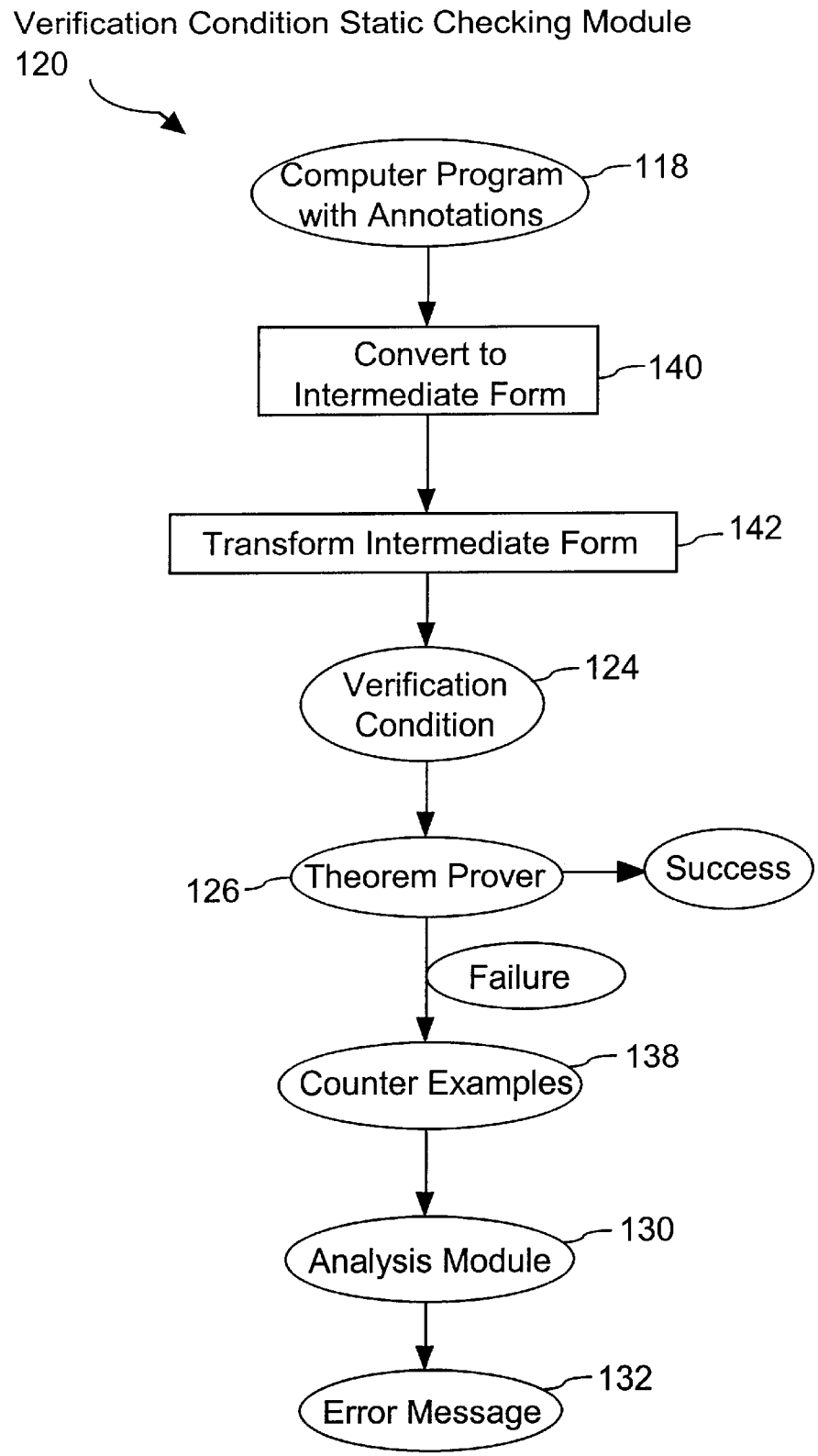
FIG. 2 is a flow chart of a method of determining whether a specified computer program satisfies a set of program conditions including the step of generating a simplified verification condition according to the method of the present invention.

A preferred embodiment of the method of the present invention is shown in FIG. 2. Referring to FIG. 2, the annotated computer program 118 to be checked is first converted into an intermediate form of the program to facilitate analysis (step 140). In a preferred embodiment, the intermediate form utilizes guarded commands that are the basis of a particularly simple programming language. Thereafter, the intermediate form of the program is processed by the verification condition generator 122. To facilitate the work of the theorem prover, the intermediate form of the program is transformed in accordance with the present invention (step 142). During the transformation step 142, labels are introduced into the VC that correspond to values of program variables at control join points. In contrast, methods in the prior art only introduce labels that correspond to the values of variables at the beginning or end of the program. The verification condition 124 produced by the VC generator according to the methods of the present invention is simplified in that certain subexpressions derived from the expressions that follow control join points are present only once in the VC. Such a simplified VC is referred to herein as a "case reduced verification condition."

The verification condition 124 for the program is represented as a "logical equation". In a preferred embodiment, the logical equation that is the verification condition 124 is expressed as a "weakest precondition". The logical equation is typically represented as a tree of sub-expressions. Various subsets and combinations of the sub-expressions must be conclusively proved to be true for all possible program conditions.

The VC is passed to the theorem prover 126 whose job is to evaluate the sub-expressions of the verification condition, for all possible program conditions, to determine which ones (if any) it cannot conclusively prove to be true. Failure to prove sufficient combinations of sub-expressions to always be true means that one or more of the pre-conditions or postconditions required for proper operation of the program is not satisfied, or may potentially not be satisfied.

It is noted that the theorem prover may not be able to prove the truth of a sub-expression, even though it is in fact true, in which case a false error report may be generated. However, the operation of the theorem prover and the generation of such false error reports are outside the scope of the present document. When it is unable to prove the truth of the VC, the theorem prover ideally produces one or more counter-examples 138 that are processed by an analysis module 130 and output as error messages 132.

Figure 3:
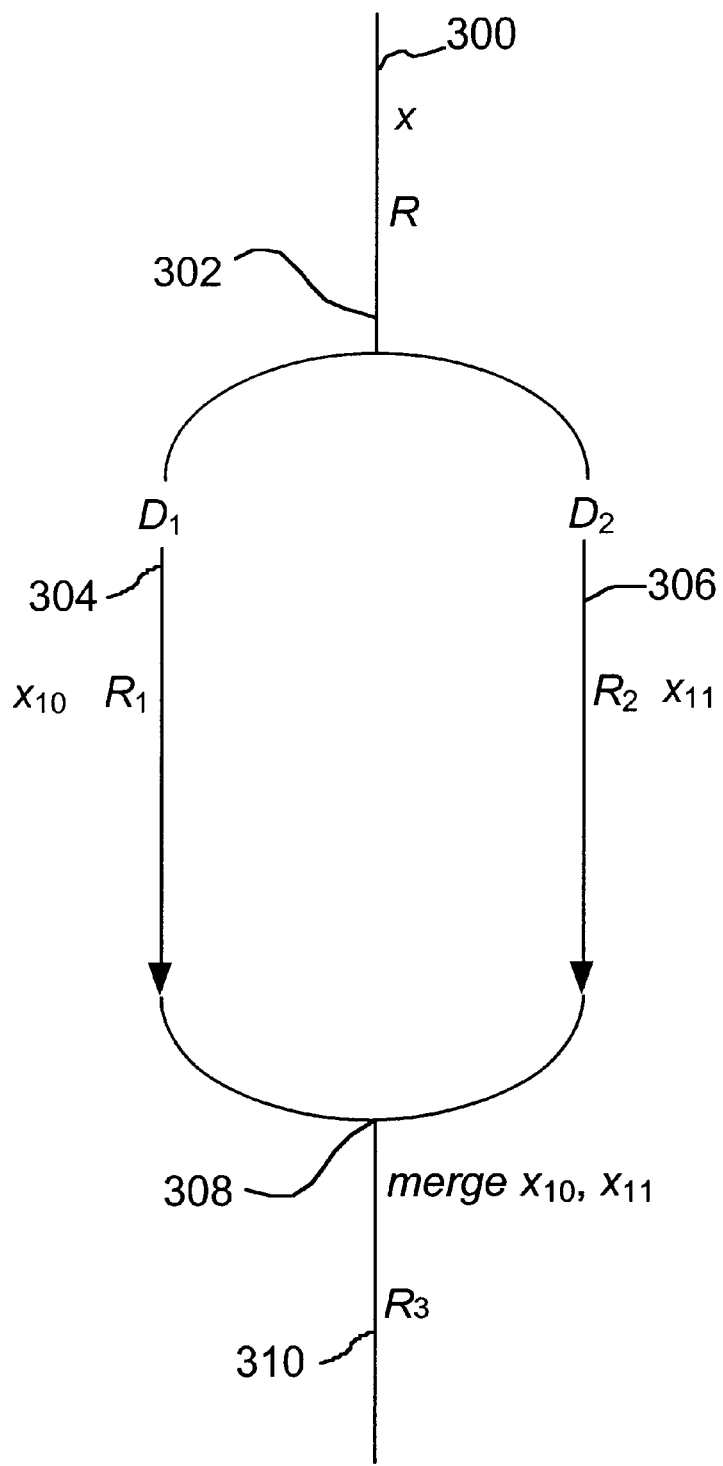
FIG. 3 is a schematic view of names assigned to a variable, x, on different branches of a program following a choice.

FIG. 3 illustrates the flow of control through a program that contains a control join point. The single execution trace 300 precedes a branch point 302. At branch point 302, one of two conditional program execution paths 304 and 306 are possible. These paths join one another at control join point 308, coalescing into a single path 310 that proceeds to execute expressions following control join point 308. In general, for any computer program, the (normal) termination of the program is a control join point. The methods of the present invention have greatest utility where they are applied to a program in which an expression or a collection of commands follows a control join point.

In this document, the term "expression" will be used, in different contexts, to mean two distinct things. First, an "expression" may be a string (such as x+1) representing the computation of a value to be stored in a variable, or used as the basis for making a decision. Secondly, an "expression" may be what is more formally called a "statement" in a program, where a statement may include a sequence or other combination of program statements (or commands). The symbol S is often used to represent a "statement" (herein called an expression), where the statement may include many lines of program code, each of which may in turn be called a statement. Taken to its natural limit, S may represent an entire computer program. Thus, the term "expression" is used to mean a sequence, collection or combination of one or more commands (or program statements). Similarly, the term "command" can mean both a single command and a sequence, collection or combination of commands.

Guarded Commands

In a preferred embodiment of the present invention, the intermediate form into which the computer program 118 is converted, is composed of guarded commands. The methods of the present invention are not limited to using intermediate forms that are based on guarded commands. Guarded commands are particularly advantageous because of their simplicity. Guarded commands are a limited set of commands that together comprise a small simplified computer programming language. The embodiment of the present invention described herein is based on Dijkstra's guarded commands (see E. W. Dijkstra, *A Discipline of Programming*, Prentice-Hall, (1976)). Other examples of guarded commands derived from Dijkstra are described elsewhere (see G. Nelson, "A Generalization of Dijkstra's Calculus", *ACM Transactions on Programming Languages and Systems,*

11(4): 517–561, (1989); and M. S. Manasse and C. G. Nelson, "Correct Compilation of Control Structures," *Bell Labs Technical Memorandum,* (Sep. 9, 1984), both of which are incorporated herein by reference).

In Table 1, hereinbelow, are the "guarded commands" used in the present invention, some of which are derived from Dijkstra. The conversion of Java programs to the set of guarded commands described in Table 1 is described elsewhere in: K. R. M. Leino, J. B. Saxe and R. Stata, "Checking Java programs via guarded commands," *SRC Technical Note* 1999-002, Compaq Computer Corporation, May 21, 1999, also available in *Formal Techniques for Java Programs,* Workshop proceedings, Ed. B. Jacobs, et al., Technical Report 251, Femuniversität Hagen, 1999, incorporated herein by reference.

In Table 1, x is a variable; e is an expression; and S is a statement.

TABLE 1

Description of Guarded Commands Used In
A Preferred Embodiment of the Invention

| Guarded Command | Explanation |
| --- | --- |
| x := e | Assign expression e to x; ("x gets e"). |
| var x in $S_1$ end | Introduce a new variable (has an arbitrary initial value). |
| assume e | Assume e is true at this point in the program (direct the checker to treat e as true). |
| assert e | Require that e is true (direct the checker to warn if e is not true). |
| $S_1$; $S_2$ | Sequential execution of $S_1$ and $S_2$. |
| $S_1$ ☐ $S_2$ | Execute either $S_1$ or $S_2$ |
| raise | Raise an exception. |
| $S_1$ ! $S_2$ | Catch an exception. |

Accordingly, the term "guarded command" as used herein will be taken to mean those commands set forth in Table 1, though it is understood by one of skill in the art that the methods of the present invention are not limited to those commands but are applicable to Dijkstra's original commands or many other variations thereof.

The guarded command, "var x in $S_1$ end" is similar to the use of a temporary variable in Java as might find application in, for example, swapping the values of two variables.

The context in which "assert e" finds application is in the annotation of programs. For the purposes of generating the verification conditions, annotations other than those required by the compiler can be introduced into the program. The purpose of "assert" is to introduce proof obligations into the verification condition. Proof obligations are conditions that permit the theorem prover to test various aspects of the operation of the program. One example is in the checking for null pointer dereferences. The annotation assert x not null represents a condition that the theorem prover checks. If there is a possibility that x is null, that possibility is encoded within the verification condition. Other examples of annotations include: a division operation wherein an "assert" is used to check whether the divisor is ever zero; and an array boundary checker.

Implied annotations are annotations that the programmer does not need to explicitly include in a program because the implied annotations are automatically assumed to apply to all instances of certain program constructs. Thus, pointer dereference instructions may be assumed to include an implied annotation asserting that the pointer to be dereferenced is not null, and division instructions may be assumed to include an implied annotation asserting that the divisor is not equal to zero.

Details of the commands "raise" and "bang" ("!") are discussed hereinbelow when considering exceptions.

The control constructs in Table 1 hereinabove do not include any constructs for introducing loops into the program. This can be explained as follows. All treatments of loops by automatic program verification systems ultimately work by rewriting a program with loops into some other semantically equivalent program without loops. (Several possible ways of doing this are explained in Section 3 of Leino et al., "Checking Java programs via guarded commands," SRC Technical Note 1999-002, Compaq Computer Corporation, May 21, 1999, referred to hereinabove). The methods of the present invention are to be applied to a loop-free program that results from some rewriting of this kind.

As an example illustrating the difference between Dijkstra's guarded commands and those presented here, the translation of an "if . . . else" control construct into guarded commands is presented:

if(e)
  {$S_1$}
else
  {$S_2$} becomes (assume e; $S_1$)☐(assume ¬e; $S_2$).

The "if . . . else" construct has been translated into two choices: an assumption that e is True and an assumption that e is False. In the guarded command form, $S_1$ and $S_2$ are themselves replaced by their respective translations into guarded commands.

In contrast, in Dijkstra's original guarded command language, the "if . . . else" control construct becomes if e→$S_1$☐¬e→$S_2$ fi wherein → is a "guard arrow". Therefore, in the implementation presented here, "assume e" is like a guard.

Weakest Preconditions

A verification condition can be produced by applying a weakest precondition operator to a program. According to methods in the prior art, it is possible to compute the weakest precondition, wp, of a program from the weakest preconditions of its various subparts. By definition, the "weakest precondition" of a program is a logical condition that ensures that the program S executes without error and terminates in a state where a postcondition P is True. Formally, wp(S,P) (also written as wp[S.P] or wp.S.P) is a predicate, or condition, that ensures that program S terminates in a state where P is True. Such a precondition operator is referred to herein as a 'traditional' precondition operator.

As an example, consider the weakest precondition of a "program" that simply increments variable x.

$wp(x := x+1, x \leq 10)$

In this case, the weakest precondition is the condition that must be fulfilled such that x has value $\leq 10$ after execution. The weakest precondition is then that x is at least 9, i.e., $x \leq 9$.

Computing Weakest Preconditions for Guarded Commands

The weakest precondition operators of the prior art, which are examples of traditional precondition operators, may be applied to the set of guarded commands used herein. Table 2 shows how the weakest precondition computations of the prior art are used to produce a VC. The variables that result in the VC refer to, i.e., label the values of the corresponding program variables in the initial state of the program.

TABLE 2

Weakest Preconditions of Guarded Commands

| Guarded Command S | Weakest Precondition wp.S.P | Comments |
|---|---|---|
| x := e | $P_{x := e}$ | P holds with every occurrence of x replaced by e. |
| var x in $S_1$ end | ∀x: wp.$S_1$.P | $S_1$ should establish P regardless of the initial value of x. |
| assume e | e ⇒ P | If e is True, P should hold. |
| assert e | e ∧ P | Both e is True and P holds. |
| $S_1$; $S_2$ | wp.$S_1$.(wp.$S_2$.P) | Weakest precondition on $S_1$ is a precursor to the weakest precondition on $S_2$. |
| $S_1$ ☐ $S_2$ | wp.$S_1$.P ∧ wp.$S_2$.P | Weakest precondition is valid for both $S_1$ and $S_2$. |

As shown in Table 2 hereinabove, for an assignment command, "x gets e," the weakest precondition, wp.S.P, is the postcondition P with every occurrence of x replaced by e. As an example, for the statement S, given by x := x+1, (i.e., increment x), subject to the postcondition P, given by x>0, the weakest precondition, wp.S.P, is x+1>0, i.e., x>−1.

For introduction of a new variable, "var x in $S_1$ end", i.e., where a new variable x is introduced with scope $S_1$, the weakest precondition, given by wp.(var x in $S_1$).P, is simply:

∀x: wp.$S_1$.P.

I.e., the postcondition, P, holds, no matter what the initial value of x.

For the choice expression, $S_1$ ☐ $S_2$, the weakest precondition involves a duplication of the postcondition, P (which is the precondition for the remainder of the program, if any, after the choice expression). This problem of duplication is magnified for the case of combinations of sequence and choice expressions. For example, consider the expression $S=(S_1 ☐ S_2); (S_3 ☐ S_4)$ subject to the postcondition, P. In this case, the resulting expression involves four copies of $wp \cdot S \cdot P = wp \cdot (S_1 ☐ S_2) \cdot (wp \cdot (S_3 ☐ S_4) \cdot P)$ $= wp \cdot (S_1 ☐ S_2) \cdot (wp \cdot S_3 \cdot P \wedge wp \cdot S_4 \cdot P)$ $= wp \cdot S_1 \cdot (wp \cdot S_3 \cdot P \wedge wp \cdot S_4 \cdot P) \wedge wp \cdot S_2 \cdot$ $(wp \cdot S_3 \cdot P \wedge wp \cdot S_4 \cdot P)$ Similar problems arise for nested choice, meaning that the verification condition is difficult to prove. In such cases, therefore, the resulting verification condition increases exponentially in size with the number of sequentially composed choice operators, and the resulting verification condition will include a corresponding large number of instances of certain postcondition expressions. As a result, the theorem prover will need to repeatedly evaluate the correctness of the repeated postcondition expressions. It is an object of the present invention to simplify the form of the VC so that it contains fewer instances of the postcondition expressions.

Dynamic Single Assumption

Thus the computation of weakest preconditions by the prior art methods of Table 2 hereinabove introduces labels only for initial values of program variables, which leads to large and difficult VC's. The methods of the present invention, as described hereinbelow, introduces names for the values of program variables at control join points when the variable is modified on at least one of the conditional program execution paths that preceded the control join point, in addition to names for their initial values.

Figure 4:
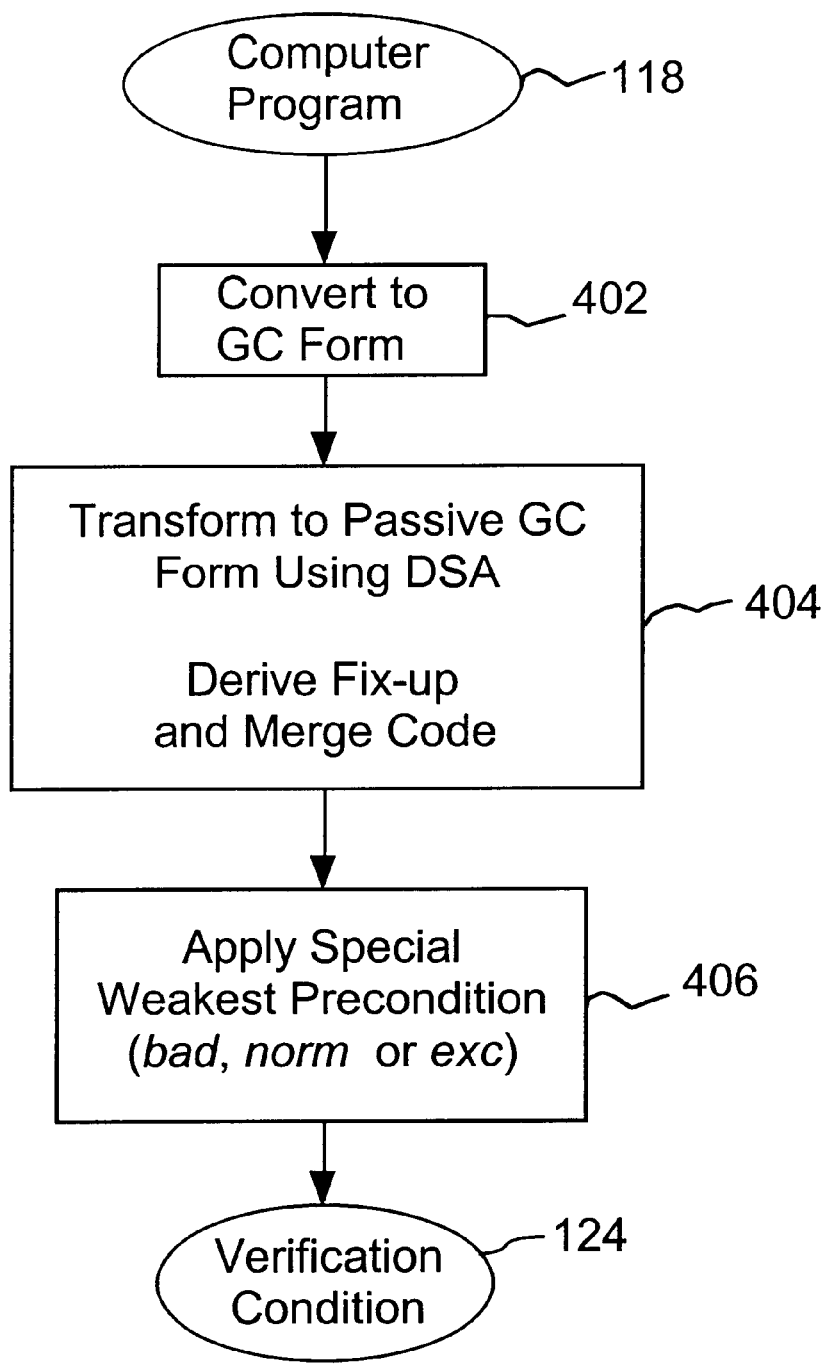
FIG. 4 is a flow chart of a method of determining whether a specified computer program satisfies a set of program conditions including a two stage process of generating a simplified verification condition according to a preferred embodiment of the method of the present invention.

In a preferred embodiment of the present invention, shown in FIG. 4, a computer program 118 is first converted to guarded command form, step 402. Then, instead of carrying out a weakest precondition computation according to the formulae of Table 2, the transformation from a set of guarded commands to a VC involves two steps. In the first step 404, the guarded command form is transformed into a semantically equivalent form called the passive guarded command form, which does not include assignments, by application of a technique referred to herein as "dynamic single assumption" (DSA). The DSA is also described in, Cormnac Flanagan and James B. Saxe, "Avoiding Exponential Explosion: Generating Compact Verification Conditions," Conference Record of POPL 2001: The 28th ACM SIGPLAN-SIGACT Symposium on Principles of Programming Languages, Jan. 17–19, 2001, London, UK., *ACM SIGPLAN Notices* 36(3):193–205, (March 2001), ISBN 1-58113-336-7, which is incorporated herein by reference in its entirety.

The application of DSA permits the introduction of labels for values of variables at control join points. Implicit in step 404 can be the derivation of "fix-up" and "merge" code, as described hereinbelow. In the second step 406, a precondition operator is applied to the passive form of the guarded commands to give rise to the VC 124. The transformation of commands to DSA form in step 404 is not limited to programs expressed in guarded command form.

As an illustration, consider the following code fragment, in guarded command form, comprising three assignments:

x:=1;
x :=x+1;
x :=x+1;

While transforming each assignment statement into an assume command, the variable that is assigned a value by the respective assignment statement is mapped into a new variable corresponding to the assignment statement. Thus, for each assignment, a new variable is introduced, and each assignment in the original code is transformed, in the DSA form, into an assumption about one of the new variables. The DSA form of the code fragment is:

assume $x_1$=1;
assume $x_2$=$x_1$+1;
assume $x_3$=$x_2$+1;

Thus the outcome of using the DSA is to replace every assignment by an "assume," accompanied by introduction of a new variable name. Such an "assume" can be referred to as a "guarded assume" command.

Although an "assume" appears similar to an assignment, each "assume" introduced by the DSA transformation can only be carried out once for each variable during the execution of a program. It is to be noted that two alternate conditional execution paths of a program can both contain an "assume" for the same variable.

The aim of the DSA transformation is to arrive at a program that is free of assignments. For example, if all variable names are different, the "var" statements may be taken to the outside of any control structure and effectively ignored. The resulting program consists entirely of statements comprising the guarded commands "assume", "assert", choice ([]) and sequential execution (;). The DSA form of a program may also be referred to as a "passive" form of the program, since it contains no assignment statements.

In order to transform commands such as guarded commands into DSA form, it is important to keep track of the mappings between variable names in the original program and variable names in the DSA program at each control point. Such a map is referred to as the "context" for a particular control point. The transformation is defined using a function, dsa, that takes two arguments, a command S and a context R for the initial state of S, and produces a pair of results: a new command S' and a context R' for the final state of S.

Accordingly, the DSA of a guarded command, such as x :=e, utilizes a mapping to keep track of variable names. As an example, if e is the expression x+y−z wherein x, y, z are variables in the guarded command form of the program, let R be the mapping $\{x \rightarrow x_1, y \rightarrow y_3, z \rightarrow z_2\}$.

Then R(e) is the expression $x_1+y_3-Z_2$. In general, R(e) is obtained from e by replacing each free occurrence of any variable v by the renaming prescribed for v by R.

Operationally, the dsa function transforms a command-map pair into another such pair. For example, if R is the mapping $\{y \rightarrow y_1\}$ and S is the command x :=y then dsa(S,R) is the pair (assume $x_1$=$y_1$, $\{y \rightarrow y_1, x \rightarrow x_1\}$)

In general, if S is a guarded command and R is a mapping, then dsa(S,R) is a pair of passive commands (called T) and a new mapping (called U), such that (1) dom(U), the domain of U, includes (at least) every variable in dom(R) and every variable assigned to in any execution of S; and (2) every possible execution of S has at least one "corresponding" possible execution of T, and vice-versa, where "corresponding" executions are related as follows:
  (a) for every variable v mentioned in dom(R), the initial value of v in any execution of S is equal to the value of R(v) in any corresponding execution of T;
  (b) corresponding executions of S and T either both go wrong or both complete normally; and
  (c) if a corresponding pair of executions of S and T both complete normally, then for every variable v in dom(U) the final value of v after the execution of S is equal to the value of U(v) in the execution of T.

By definition, a program "goes wrong" when it is caused to execute a sub-command of the form "assert e" from a state where the expression e evaluates to False. (Note that it is unnecessary to distinguish initial and final values for the execution of T, since T includes no assignment commands.)

Condition (2)(b) hereinabove means that the verification condition for S will be valid (signifying that S can never go wrong) if and only if the verification condition for T is valid. Because T contains no assignment statements, its VC can be computed by a specialized method (described hereinbelow and summarized in Table 5). The resulting formula will often be smaller, and its validity easier to test, than would be the case for a verification condition for the original command S computed using prior art methods (e.g., as in Table 2).

The DSA for each guarded command is shown in Table 3 hereinbelow, in which "where" means that the ensuing code defines how the replacement commands (such as $D_1$ and $D_2$) and the new renaming function(s) (such as $R_1$, and $R_2$) are generated. Before applying the DSA rules in Table 3, each subcommand of the form "var x in Send" should be replaced by $S_{x\ :=x'}$ where the various x' are chosen to be unique.

The DSA transformation is applied to any nested set of commands from the inside to the outside. Thus, also, as shown in Table 3, hereinbelow, a pair of conditional program execution paths is converted into a first group of guarded commands coupled by a choice operator to a second group of guarded commands.

TABLE 3

Transforming Guarded Commands to Dynamic Single Assumption Form

| Guarded Command, S | dsa(S,R) |
|---|---|
| x := e | (assume $x_n$ = R(e), R[x → $x_n$]) where $x_n$ is a new name OR (assume True, R[x → R(e)]) |
| assume e | (assume R(e), R) |
| assert e | (assert R(e), R) |
| $S_1$; $S_2$ | ($D_1$; $D_2$, $R_2$) where ($D_1$,$R_1$) = dsa($S_1$,R) ($D_2$,$R_2$) = dsa($S_2$,$R_1$) |
| $S_1$ ☐ $S_2$ | (($D_1$; $FX_1$) ☐ ($D_2$; $FX_2$), $R_3$) where ($D_1$,$R_1$) = dsa($S_1$,R) ($D_2$,$R_2$) = dsa($S_2$,$R_1$) ($FX_1$, $FX_2$, $R_3$) = merge($R_1$,$R_2$); |

In Table 3, FX is "fix-up" code and merge is a function that generates the "fix-up" code and a merge-map, both of which are defined below. The dsa function is thus an exemplary transformation function having as one of its outputs a modified mapping for application to a subsequent statement of the computer program, such that the modified mapping is based on variable mappings produced by transformation functions on earlier statements of the computer program.

In general, the outcome of applying dsa to a guarded command S and an initial renaming function R is both a new command S and a new renaming function R. The DSA additionally introduces new variable names.

The transformation of an assignment statement produces an assume command, such that the transformation includes mapping a variable that is assigned a value by the assignment statement into an expression denoting a value of the variable after the assignment statement.

In a preferred embodiment, as shown in the first entry in Table 3, for simple assignment expressions it is possible to avoid introducing a new variable. In such cases the mapping just associates the variable x with whatever expression was originally present, i.e., includes a mapping function that maps said variable to the result of applying to the simple expression corresponding a mapping function to a program state before the assignment statement, and accompanies it with a no-op, "assume True." Thus the range of possible mappings for an assignment includes variables to expressions as well as variables to variables. In practice, according to the preferred embodiment of the present invention, whether an assignment is represented by mapping that introduces a new variable name or one which produces a simple substitution, is determined by the complexity of the expression on the right hand side of the assignment.

The implicit assumption behind the DSA is that, as demonstrated in FIG. 3, although the same variable x starts in R, before a branch point such as 302, it may attain different variable assignments on either of the ensuing conditional program execution paths such as 304 and 306. In FIG. 3, $D_1$ and $D_2$ are collections of one or more executed statements. In FIG. 3, variable x before the branch point attains variable names $x_{10}$ and $x_{11}$, in each respective branch 304 and 306, both of which need to be merged together after the control join point 308. There is always an implicit control join point at the end of a program.

As an example, the following program fragment is transformed into DSA, or "passive," command form:

$$dsa((x:=5 \square (x:=6;x:=x+1));\text{assert } x>y,(x \to x_0, y \to y_0))$$

where the last term in the parentheses is the mapping given, say, by R. This example comprises a choice (☐) as well as a sequential composition (semi-colon) operator. The DSA's for each command are therefore embedded in the DSA for the program fragment. The form of the DSA translation for each command is presented in Table 3, hereinabove. Inserting the appropriate expressions, the translation is:

(((assume $x_1$=5; assume $x_4$ =$x_1$) ☐ (assume $x_2$=6; assume $x_3$=$x_2$+1); assume $x_4$=$x_3$));

assert $x_4$>$y_0$.

In this example, "assume $x_4$=$x_1$" in the first parenthesis and "assume $x_4$=$x_3$" in the second set of parentheses are respectively "fix-up code." The purpose of the fix-up code is to synchronize, i.e., produce a consistent labeling of, the variables at the conclusion of each conditional execution path of the choice operator. This is important to achieve if the program fragment is embedded in a larger piece of code that includes commands following the program fragment.

The fix-up code $FX_1$ and $FX_2$ for merging the renaming functions of two program paths, merge($R_1$, $R_2$), is generated using the merge procedure of Table 4.

TABLE 4

Merge Procedure for Merging Mapping Functions $R_1$ and $R_2$

```
FX₁ := Assume True;
FX₂ := Assume True;
R := empty map;
for each x in dom(R₁) ∪ dom(R₂) do
    if x is not in dom(R₁) then
        R := R[x → R₂(x)]
    elseif x is not in dom(R₂) then
        R := R[x → R₁(x)]
    elseif R₁(x) = R₂(x) then
        R := R[x → R₁(x)]
    else
        let xₙ be a new name for x
        FX₁ := "FX₁; assume xₙ = R₁(x)"
        FX₂ := "FX₂; assume xₙ = R₂(x)"
        R := R[x → xₙ]
    endif
end for
return (FX₁, FX₂, R)
```

At the top of the merge procedure of Table 4, the fix-up codes are initially null and the mapping set is empty. The for-loop in the merge code iterates over all the variables that are either in the map $R_1$ or the map $R_2$. For each variable x, if $R_1$ and $R_2$ map x to the same variable name, there is no conflict, no new fix-up code is needed and the return output variable map, R, just maps x to whatever it was mapped to by $R_1$ (or $R_2$). However, the last else branch within the for loop takes care of the general case where x is mapped differently, i.e., to different variable names, by $R_1$ and $R_2$. A new name $x_n$ is introduced to represent the value of x at the control join point, and the fix-up code for each path to the join point is extended with an assumption that the value of x at the end of that path is equal to $x_n$. The extension of the fix-up code is effectively a concatenation operation and could be written in the form:

$$FX_1 := FX_1 + \text{"; assume } x_n = R_1(x)\text{"}$$

Whatever string FX represented before, i.e., whatever set of assume commands, has now tacked on to it another assume command to cope with the variable in question. Ultimately, the two pieces of fix-up code and the mapping are returned; the result of merge is used in the DSA for a choice operator.

VC Generation for Passive Commands

In a language with assignments, one can think of a program starting in an initial state comprising certain values of its constituent variables and finishing in a final state with certain values of its constituent variables, some of which may be different from the respective initial values.

By contrast, in a program comprising guarded commands in which assignments are represented by assumes, the starting states are constrained. As an example, consider the program:

assume x=6;

This program can only execute with the starting value, x=6. By contrast, the program:

assume $x$=6 ☐ assume $x$=7;

has only two possible starting states. Furthermore, in a language composed of assumes and asserts, certain starting states will result in error-free termination of the program, whereas others will not. The goal of the theorem prover is to ascertain those states that result in, say, a bad assertion. For example, a "good" program (i.e., a program that will execute and terminate correctly) is:

assume x>1; assert x>0.

This is a good program because it can only execute in states where x is >1 and the condition that x>0 must therefore be true. By contrast, the following program is not good:

assume x>0; assert x>1.

The assertion could be wrong in the case x=1 and the program could go wrong.

In summary, there may be some states in which a program executes correctly, some in which the program goes wrong, and even some in which the program does not execute at all.

The absence of assignment statements means that the execution of a passive statement cannot change the program state, and the only effect of such an execution is to choose among the two possible outcomes: normal termination and going wrong. Thus the semantics of a passive statement S can be completely captured by two outcome predicates, one which describes the initial states from which the execution of S may terminate normally, and one which describes states from which the execution of S may go wrong.

According to the methods of the present invention, two operators are introduced to enable computation of wp for passive commands, namely norm(S) and bad(S):

norm(S) represents the set of states from which the program S could execute normally;

bad(S) represents the set of states from which the program S could go wrong.

For any passive command, S, $$wp(S, \text{True}) = \neg bad(S)$$

Both bad and norm are precondition-like predicate transformers that are different from traditional precondition operators such as wp and which may only be applied to passive commands. In generating the case-reduced VC according to the methods of the present invention, bad and norm take the place of the conventional wp of the prior art. The present invention also utilizes a special predicate transformer, exc, for the "exceptional" termination of a program, which is further described hereinbelow.

In the foregoing example, represent the program:

assume x>0; assert x>1.

by S. Then:

$$norm(S) \equiv x > 1;$$

$$bad(S) \equiv x > 0 \land x 1.$$

The ultimate goal is to generate a good program, S. A program S is free of errors when bad(S)="False", i.e., when no states can go wrong. Accordingly, the expressions for the application of the norm and bad operators to each kind of passive guarded command are shown in Table 5, hereinbelow.

TABLE 5

Precondition Operators Applied to Passive Commands

| Guarded Command, S | norm(S) | bad(S) | Comment |
|---|---|---|---|
| assert e | e | ¬e | "assert e" is executed normally if e is True; conversely, if e is False, "assert e" causes the program to execute incorrectly. |
| assume e | e | False | Program can execute normally if e is True; since e is assumed to be True, it cannot at the same time be False, and therefore the assume command cannot go wrong. |
| $S_1$ ☐ $S_2$ | norm($S_1$)∨ norm($S_2$) | bad($S_1$)∨ bad($S_2$) | Program can execute normally if either $S_1$ or $S_2$ executes normally. Program can go wrong if either $S_1$ or $S_2$ goes wrong. |
| $S_1$; $S_2$ | norm($S_1$)∧ norm($S_2$) | bad($S_1$)∨ (norm($S_1$)∧ bad($S_2$)) | Program can execute normally when both $S_1$ and $S_2$ execute normally, in sequence; program goes wrong if either $S_1$ goes wrong or if $S_1$ executes normally but then $S_2$ goes wrong. |

The bad and norm functions shown in Table 5 can be used to compute the weakest precondition of a specified program that is expressed in passive command form.

As an example of the representation of guarded commands in this way, consider the conversion of the following Java code fragment (which is an instance of the "if . . . else" control construct considered previously):

```
{if (b){
   x=x+1;
}else{
   x=0;
}
```
S (where S is some Java Statement). This simple Java construct becomes, in guarded command form:

((assume $b$; $x := x+1$)☐(assume $\neg b$; $x:=0$)); S where, as before, S would be represented by its translation into guarded command form. Given the initial mapping $\{x \rightarrow x_1\}$, the transformation to DSA produces the following passive command and another map:

((assume b; assume $x_2=x_1+1$; assume $x_4=x_2$)☐
(assume $\neg$b; assume $x_3=0$; assume $x_4=X_3$)
);S' where S' is the passive form of S translated using $\{x \rightarrow x_4\}$ as the initial mapping. The variable $x_4$ has been introduced to capture the value of x at the control join point. Referring to the preceding expression as D, it may further be written as $(D_1 \square D_2)$; S'. In order to obtain the verification condition, bad(D) is computed. This, according to the foregoing expression, is calculated as the bad of the two expressions, $(D_1 \square D_2)$ and S', separated by the semi-colon operator. Using the expressions shown in Table 5, bad(D) is computed as follows:

$$bad(D) = bad(D_1 \square D_2) \vee (norm(D_1 \square D_2) \wedge bad(S'))$$

The first part of this expression is automatically False because in this case there are no asserts in $D_1$ or $D_2$. Therefore $(D_1 \square D_2)$ never goes wrong in this particular case. This type of simplification is representative of the simplifications that are often (but not always) achievable when generating the VC expression for a program that has been transformed into passive form, wherein Dynamic Single Assumption has been used to transform the guarded commands into passive form.

After further simplification, bad(D) is evaluated as follows:

$$bad(D) \equiv False \vee ((norm(D_1) \vee norm(D_2)) \wedge bad(S'))$$

$$\equiv ((norm(assume\ b) \wedge norm(assume\ x_2 = x_1 + 1) \wedge$$

$$norm(assume\ x_4 = x_2)) \vee (norm(assume\neg\ b) \wedge$$

$$norm(assume\ x_3 = 0) \wedge norm(assume\ x_4 = x_3)) \wedge bad(S'))$$

$$\equiv ((b \wedge x_2 = x_1 + 1 \wedge x_4 = x_2) \vee (\neg b \wedge x_3 = 0 \wedge x_4 = x_3)) \wedge$$

$$bad(S')$$

The guarded command expression of the "if . . . else" construct and bad(S') are present in the final simplification. In other words, the postcondition expression bad(S') is only present once in the VC expression for the portion of the program comprising the "if . . . else" construct.

Thus, in a situation whereby a pair of conditional program execution paths is transformed to a first group of guarded commands coupled by a choice operator to a second group of guarded commands, the resulting verification condition comprises:

a logical OR of a first condition corresponding to the first group of guarded commands and a second condition corresponding to the second group of guarded commands; connected by an implication to a single instance of a post-condition, corresponding to the expression following the control join point, that must always be true after execution of either the first or the second groups of guarded commands.

As illustrated hereinbelow, this outcome is contrasted with the standard VC expression, obtained according to the methods of the prior art, that contains at least two instances of the postcondition expression. The same code fragment in guarded command form is:

((assume $b$; $x := x+1$)☐(assume $\neg b$; $x:=0$)); S

Representing this expression by G, the conventional application of weakest preconditions to G is given by:

$$wp(G, True) \equiv (b \Rightarrow (wp(S, True)_x := +1) \wedge (\neg b \Rightarrow (wp(S, True)_x := 0)$$

To evaluate this expression for the weakest precondition for G, it is necessary to evaluate the weakest precondition of S twice, once each with x=0 and x=x+1. If S is itself a large or complex expression, this is costly. Also if there are further "if . . . else" constructs in the same program, even further copies of S will be included in the VC and thus even further copies of the weakest precondition of S will be required to be evaluated. Furthermore, if x appears in S, the multiple copies will be slightly different from one another. In this example, one copy would have x replaced by x+1 and the other copy would have x replaced by 0. Consequently, memory resources will be taken up by the similar, but not identical, copies.

In summary, one important aspect of the present invention is that when computing the weakest precondition of an expression such as $(S_1 \square S_2)$; $S_3$, wherein $S_3$ is a complex expression (e.g., containing a collection of commands and possibly additional choice expressions), an evaluation of the weakest precondition of $S_3$ for both branches of the choice is avoided. The weakest precondition of an expression, such as $S_3$, that follows the choice operator is a postcondition for the expressions on either side of the choice operator. In particular, the application of the operators bad and norm to statements in passive form leads to a direct simplification that does not arise from the application of the conventional wp operators of the prior art. As an example, consider the program, S:

(assume $e_1$☐assume $e_2$); assert P and let $S_1$ be "assume $e_1$", $S_2$ be "assume $e_1$" and $S_3$ be "assert P." Using the bad and norm precondition operators of Table 5 hereinabove the weakest precondition is evaluated as follows:

$$wp(S, True) = \neg\ bad(S)$$

$$= \neg\ bad(S_1 \square S_2) \vee (norm(S_1 \square S_2) \wedge bad(S_3))$$

$$= \neg\ (False \vee False) \vee ((e_1 \vee e_2) \wedge \neg\ P)$$

$$= \neg\ ((e_1 \vee e_2) \wedge \neg\ P)$$

The final form includes the postcondition P only once. By contrast, using the wp operators of Table 2, hereinabove:

$$wp(S, True) = (e_1 \Rightarrow P) \wedge (e_2 \Rightarrow P)$$

This expression contains two instances of P and must be further simplified by application of a rule of logic, viz: the equivalence of the expression $(p \Rightarrow r) \wedge (q \Rightarrow r)$ to $(p \vee q) \Rightarrow r$. The simplification that was inherent in the application of bad and norm to the passive command form is not automatically produced by the application of the traditional weakest precondition operator, wp.

A further important advantage of the present invention arises when expressions on either branch of program execution following a choice operator contain assignments. In general, the simplification of an expression of the form (p∧r) ∨ (q∧r) to (p ∨ q)∧r can only be achieved when r is the same on both branches. Assignments are troublesome because they can change the representation of r. Consequently, an expression appearing on both sides of a branch may not be the same on both sides because of the various variable replacements that occur.

As seen, the weakest precondition of any expression, P, involving an assignment, is:

$$wp(x := e, P) = P_{x := e}$$

Consider the program T:

((assume $e_1$; x=f)☐(assume $e_2$; x =g)); assert P.

According to the application of traditional weakest precondition operators, as shown in Table 2, hereinabove, $$wp(T, \text{True}) = (e_1 \Rightarrow P_{x := f}) \wedge (e_2 \Rightarrow P_{x := g})$$

Since the oc'currences of P with x replaced by $f_1$ and $f_2$ respectively are not identical to one another, the simplification discussed hereinabove cannot be applied. However, simplification becomes possible by eliminating assignments from T using the Dynamic Single Assumption methodology described hereinabove. T is transformed into passive form by translating the assignment commands into "assume" commands according to the expressions in Table 3. The weakest precondition of the passive form of T can then be obtained by application of the bad and norm operators of Table 5, as described in the foregoing example, during which the simplified form in which P appears once is automatically generated.

Ultimately, then, the embodiment of the present invention described hereinabove eliminates assignment commands to avoid the need to include multiple instances of choice expression postconditions in the VC, thereby avoiding or reducing the repetitious evaluation of effectively identical expressions (i.e., the multiple instances of the choice expression postconditions) by the theorem prover. While the application of DSA does not vitiate all possible occurrences of duplication or near duplication of subexpressions, it relieves the situation in many cases.

Exceptions

Heretofore, the possibility that a program may terminate exceptionally has been ignored. The guarded commands, introduced in Table 1 hereinabove, are able to model exceptions, but the discussion of DSA and weakest preconditions ignored exceptions. The additional guarded commands, "raise" and "bang" ('!') permit exceptions to be modelled, and the VC-generation techniques described hereinabove can be extended to apply to situations where a program terminates exceptionally. Accordingly a modified version of DSA is described, hereinbelow.

An exceptional outcome leaves the variables in some state but is not the same as an outcome in which the program goes wrong or terminates normally. Exceptions are used to model premature exit conditions from portions of the code. They are used to control the behavior of the program when such a condition arises. A program written in a language such as Java can be written to explicitly handle specified exceptions and therefore the translation of such a program into guarded commands should be able to handle exceptions. Other programming constructs such as an intermediate "return" statement from a procedure (in Java, a "method"), or a "break" statement within a loop are also modeled as exceptions. Table 6 describes how the guarded commands of Table 1 behave when an exception arises

TABLE 6

Effect on Guarded Commands when an Exception Arises

| Guarded Command, S | Behavior of S. |
|---|---|
| x := e | Assign e to x and terminate normally. (An exception is never raised) |
| assume e | if e = True, S terminates normally. No execution is possible otherwise. |
| assert e | if e = True; S terminates normally. If e is False, S goes wrong. |
| $S_1$ ; $S_2$ | Sequential composition. Execute $S_1$. If $S_1$ terminates normally, execute $S_2$. If $S_1$ goes wrong or terminates exceptionally, $S_2$ is ignored. |
| $S_1$ ☐ $S_2$ | Execute either $S_1$ or $S_2$ choosing nondeterministically. |
| raise | Terminate exceptionally. |
| $S_1$ ! $S_2$ | Exception handling. Execute $S_1$. If $S_1$ goes wrong or terminates normally, $S_2$ is ignored. If $S_1$ terminates exceptionally, execute $S_2$. |

In order to transform guarded commands into a VC that behaves properly when an exception arises, an alternate, expanded definition of the weakest precondition, wp, is utilized and written as wp (S, N, X), wherein S is a guarded command, N is a normal postcondition and X is an exceptional postcondition. In an equivalent notation, the expanded definition of the weakest precondition is expressed as wp.S.(N, X).

The weakest precondition is then the weakest predicate, P, such that:

every normally terminating execution of S that starts in a state satisfying P terminates in a state satisfying N;

every exceptionally terminating execution of S that starts in a state satisfying P, terminates in a state satisfying X, and no execution of S starting in a state satisfying P goes wrong.

This is an extension of the teachings of Dijkstra to accommodate the possibility of exceptions. Dijkstra's only terminating condition was the normal postcondition, N. (See E. W. Dijkstra, A Discipline of programming, Prentice-Hall (1976).)

The two guarded commands, "raise," and "bang" ('!') which is the "dual" of the sequential operator; find special application to the modelling of exceptions.

When using the "raise" operator to model a language with multiple exceptions, an appropriate convention is to record the particular exception raised in a reserved global variable, for example xvar. Thus the raising of a particular exception E is modeled with xvar :=E; raise.

The "bang" operator (as in $S_1!S_2$) shows how to handle an exception when it is raised, say, by $S_1$: the bang operator catches it. Here, if $S_1$ terminates exceptionally, then $S_2$ is executed. For example, in a string of sequentially executed statements:

( . . . ; raise ; . . . )!$S_2$

The statements in parenthesis jump straight to $S_2$ when an exception is raised. If the statements in parenthesis all execute normally, then the program finishes normally, unless $S_2$ itself terminates exceptionally in which case the program can finish exceptionally. Recalling the norm and bad operators, in Table 5 hereinabove, which represent, respectively, the set of states where a specified passive command could execute or terminate normally or badly, the exc operator is now introduced to enable computation of wp for passive commands that could terminate exceptionally. Accordingly, exc (S) represents the set of states from which the program, S, could terminate exceptionally.

The exc operator is used when generating verification conditions.

Table 7 extends the VC generation technique of Table 5 hereinabove to passive commands that may include exceptions.

TABLE 7

Precondition Commands for Passive Commands when Exceptions Occur

| Guarded Command, S | norm (S) | exc (S) | bad (S) |
|---|---|---|---|
| assume e | e | False | False |
| assert e | e | False | ¬e |
| $S_1 ; S_2$ | norm $(S_1) \wedge$ norm $(S_2)$ | exc $(S_1) \vee$ (norm $(S_1) \wedge$ exc $(S_2)$) | bad $(S_1) \vee$ (norm $(S_1) \wedge$ bad $(S_2)$) |
| $S_1 \Box S_2$ | norm $(S_1) \vee$ norm $(S_2)$ | exc $(S_1) \vee$ exc $(S_2)$ | bad $(S_1) \vee$ bad $(S_2)$ |
| raise | False | True | False |
| $S_1 ! S_2$ | norm $(S_1) \vee$ exc $(S_1) \wedge$ norm $(S_2)$ | exc $(S_1) \wedge$ exc $(S_2)$ | bad $(S_1) \vee$ (exc $(S_1) \wedge$ bad $(S_2)$) |

As with bad, the exceptional termination of "assume e" never happens and is therefore False. Furthermore, norm (raise) is False because raise never terminates normally—it automatically raises an exception. Correspondingly, because "raise" always terminates exceptionally, exc (raise) is True.

The expressions for exc and bad of the sequential composition operator $S_1$; $S_2$ mirror one another. They have similar forms in which bad and exc occupy corresponding positions. On the other hand, $S_1!S_2$, which is the dual of $S_1$; $S_2$, is such that norm and exc have changed places as well as column positions in Table 7, compared with Table 5.

It is also possible to derive forms for exceptional termination using "weakest precondition" language. As before, the job of the theorem prover when evaluating the VC of a program is to determine if there are any states for which bad of the program is True, or alternatively to determine whether bad of the program is False for all possible states of the program.

As shown hereinafter, the technique (given in Table 3 hereinabove) for transforming guarded commands to passive form can be extended to deal with commands that may include exceptions. Before listing the version of the DSA transformation that handles exceptional as well as normal commands, the following three points should be noted.

First, the DSA transformation presented hereinabove had, as one of its results, a mapping describing the state of the program variables at termination. The result of the modified DSA transformation includes two maps, one describing the state of the program variables upon normal termination and the other describing their state upon exceptional termination.

Second, in the original guarded command language the only source of control join points was the non-deterministic choice operator □. It is also important to handle additional join points, for example, in $(S_1; S_2)!S_3$ where the exceptional outcomes of $S_1$ and $S_2$ join at the start of $S_3$. The implication for the DSA is additional calls to the merge function.

Third, since raise has no normal outcome and several commands have no exceptional outcome, it is worthwhile as an optimization to introduce the special map "bottom", which represents the condition that control cannot reach the relevant control point. Thus "bottom" is used to indicate infeasible code paths.

A version of DSA embodying these changes is presented in Table 8. In the Table, FN and FX are fix-up codes for, respectively, normal and exceptional termination.

TABLE 8

| Guarded Command, S | dsa (S,R) | Comment |
|---|---|---|
| x := e | (assume $x_n$ = R(e), R[with x → $x_n$], bottom) | |
| assume e | (assume R(e), R, bottom) | |
| assert e | (assert R(e), R, bottom) | |
| $S_1 ; S_2$ | let $(D_1, R_1, X_1)$ = dsa $(S_1, R)$<br>let $(D_2, R_2, X_2)$ = dsa $(S_2, R_1)$<br>let $(FX_1, FX_2, X)$ = merge $(X_1, X_2)$<br>$(((D_1 ! (FX_1; \text{raise})); (D_2 ! (FX_2; \text{raise}))), R_2, X)$ | X is the renaming function resulting from merging of $X_1, X_2$. |
| $S_1 \Box S_2$ | let $(D_1, R_1, X_1)$ = dsa $(S_1, R)$<br>let $(D_2, R_2, X_2)$ = dsa $(S_2, R)$<br>let $(FN_1, FN_2, R_3)$ = merge $(R_1, R_2)$<br>let $(FX_1, FX_2, X)$ = merge $(X_1, X_2)$<br>$((((D_1; FN_1) ! (FX_1; \text{raise}))\Box$<br>$((D_2; FN_2) ! (FX_2; \text{raise}))), R_3, X)$ | |
| raise | (raise, bottom, R) | raise never terminates normally |
| $S_1 ! S_2$ | let $(D_1, R_1, X_1)$ = dsa $(S_1, R)$<br>let $(D_2, R_2, X_2)$ = dsa $(S_2, X_1)$<br>let $(FN_1, FN_2, R_3)$ = merge $(R_1, R_2)$<br>$((D_1; FN_1) ! (D_2; FN_2), R_3, X_2)$ | |

In Table 8, the last argument of the dsa for the guarded command, x :=e, is "bottom", meaning that this command never terminates exceptionally so no mapping is required for that outcome.

Having introduced the special map "bottom" as an optimization, merge($R_1, R_2$) can be redefined to take advantage of it, as follows:

if $R_1$=bottom then
    return (assume True, assume True, $R_2$)
else if $R_2$=bottom then
    return (assume True, assume True, $R_1$)
else
    proceed as in the merge procedure described in Table 4 hereinabove.

In the above, "assume True" is a no-operation (a "no-op"). Since the fix-up code is only used as the right argument to ";", and since "S; assume True" is equivalent to "S" for any command S, these cases require no insertion of fix-up code. Such a situation arises frequently, in, for example a long sequence of statements wherein many of the statements do not raise an exception. Therefore, many of the paths through the code have a "bottom" on them and it is not necessary to generate fix-up code.

Application of Strongest Postcondition to the Weakest Precondition Computation In the embodiment described hereinabove, the command to be checked is translated into passive form via the DSA equations of Tables 3 and 8 and then the passive form is translated into a VC via a special version of the weakest precondition computation, using norm, bad, and, if applicable, exc, as described in Tables 5 and 7. Thereby, assignments are removed, and labels are introduced for variables at control join points as well as for their initial values.

In a second embodiment, a VC is computed directly from the original command using another special version of the weakest precondition computation, in which weakest preconditions of some subcommands are computed in terms of strongest postconditions. Although the equations involved are quite different from one another, both approaches end up labelling the values of targets at control join points, and thereby eliminate or reduce duplication or near duplication of subexpressions that follow the control join point in the eventual VC. In the second embodiment it is not necessary to remove assignments.

By definition, the strongest normal postcondition, snp, of an expression, S, is such that:

snp(S, P)≡ the strongest predicate, N, such that every normally terminating execution of S starting from a state that satisfies P, terminates in a state satisfying N.

That is, if S starts in a state satisfying P, and terminates normally, snp is the most that can be said about the final state.

Analogously, the strongest exceptional postcondition, sxp (S, P) is given by:

sxp(S, P)≡ the strongest predicate X such that every exceptionally terminating execution of S starting in a state satisfying P terminates in a state satisfying X.

The strongest postcondition, then, of an expression is computed according to the following equations, wherein Q and P are predicates, $S_1$ and $S_2$ are commands, x is a variable and e is an expression.

Strongest normal postconditions:

snp(assume Q, P)≡Q∧P snp(assert Q, P)≡Q∧P snp(raise, P)≡False snp(x:=e, P)≡(∃x':$P_{x\ :=x'}$∧x=$e_{x\ :=x'}$)

snp($S_1$; $S_2$, P)≡snp($S_2$, snp($S_1$, P))

snp($S_1$!$S_2$, P)≡snp($S_1$, P)∧snp($S_2$, sxp($S_1$, P))

snp($S_1$□$S_2$, P)≡snp($S_1$, P) ∨ snp($S_2$, P)

Strongest exceptional postconditions:

sxp(assume Q, P)≡False sxp(assert Q, P)≡False sxp(raise, P)≡P sxp(x:=e, P)≡False sxp($S_1$; $S_2$, P)≡sxp($S_1$, P) ∨ sxp($S_2$, snp($S_1$, P))

sxp($S_1$!$S_2$, P) sxp($S_2$, sxp($S_1$, P))

sxp($S_1$□$S_2$, P) sxp($S_1$, P) ∨ sxp($S_2$, P)

An example of strongest postconditions is as follows. The strongest normal postcondition of an expression, given by:

$$snp(v:=v^2, v\geq 3)$$

becomes $$\exists v'\ \text{such that}\ v'\geq 3 \land v=(v')^2$$

That is, it is desired to ascertain what values integer v could end up with when it is squared, subject to the precondition that v is at least 3. The answer is that there is some initial value of v, denoted v', such that v' satisfies the precondition and such that the final value of v is the value of the expression with v' substituted for v. (v' is rather like a dummy variable, but it is important to ensure that its name does not conflict with other variable names already used.)

For the simplification of expressions obtained by applying snp to expressions that include assignments, a general rule, the "one point rule" may be used. The one-point rule says that an expression of the form:

$$\forall y: y=x \Rightarrow P$$

or $$\exists y: y=x \land P$$

is equivalent to $P_{y:=x}$.

The approach adopted to case-reduced VC generation in this embodiment, is to compute the weakest precondition of subexpressions in terms of the strongest exceptional and strongest normal postconditions, according to the following relationship, denoted by Equation 1:

$$wp(S, N, X) = wp(S, \text{True}, \text{True}) \land (\forall TT, T: (snp(S_{T:=TT}; T':=TT, TT=T) \Rightarrow N_{T:=T'}) \land (sxp(S_{T:=TT}!(T':=TT; \text{raise}), TT=T) \Rightarrow X_{T:=T'})) \quad \text{(Eq. 1)}$$

Equation 1 caters for the possibility of exceptional termination of the program. A simpler form of Equation 1 for use with a guarded command language without exceptions is presented as Equation 2:

$$wp(S, N) = wp(S, \text{True}) \land (\forall TT, T: (sp(S_{T:=TT}; T':=TT, TT=T) \Rightarrow N_{T:=T'})) \quad \text{(Eq. 2)}$$

wherein sp is an ordinary "strongest postcondition" operator. In the discussion hereinbelow, Equation 1 is discussed.

Selective application of Equation 1 to expressions containing the choice operator can lead to the desired simplified forms of verification conditions. In Equation 1, not disclosed in any previous publication, S is a command and N and X are normal and exceptional postconditions. The variables T, TT and T' are tuples of variables. In particular, T represents the "target variables" of command S, that is a list of all program variables that may be modified by S. (Such variables are those that occur on the left hand sides of assignment commands that are subcommands of S.) An expression such as $N_{T:=T'}$ means N with each variable in T replaced by the corresponding adorned variable in T'. T' and TT represent "adornments" of T, i.e., systematic renamings of the variables in T to new names that do not occur in S, N, or X. An adornment of a variable is also referred to herein as an adorned variable or an inflection of the variable. For example if S contains assignments to variables u and v (and to no other variables), then Equation 1 becomes:

$$wp(S, N, X) \land (\forall uu, vv, u', v': (snp(S_{u:=uu, v:=vv}; u':=uu; v':=vv, (uu, vv)=(u, v)) \Rightarrow N_{u:=u', v:=v'}) \land (sxp(S_{u:=uu, v:=vv}!(u':=uu ; v':=v; \text{raise}), (uu, vv)=(u, v)) \Rightarrow X_{u:=u', v:=v'}))$$

wherein uu, vv, u', and v' are variable names not already occurring in S, N, or X.

In both the present embodiment and in the embodiment described hereinabove in which the DSA is employed, a given program variable may have several adornments, corresponding to the labels introduced for the values taken on by the given program variable at various points in the program.

Figure 5:
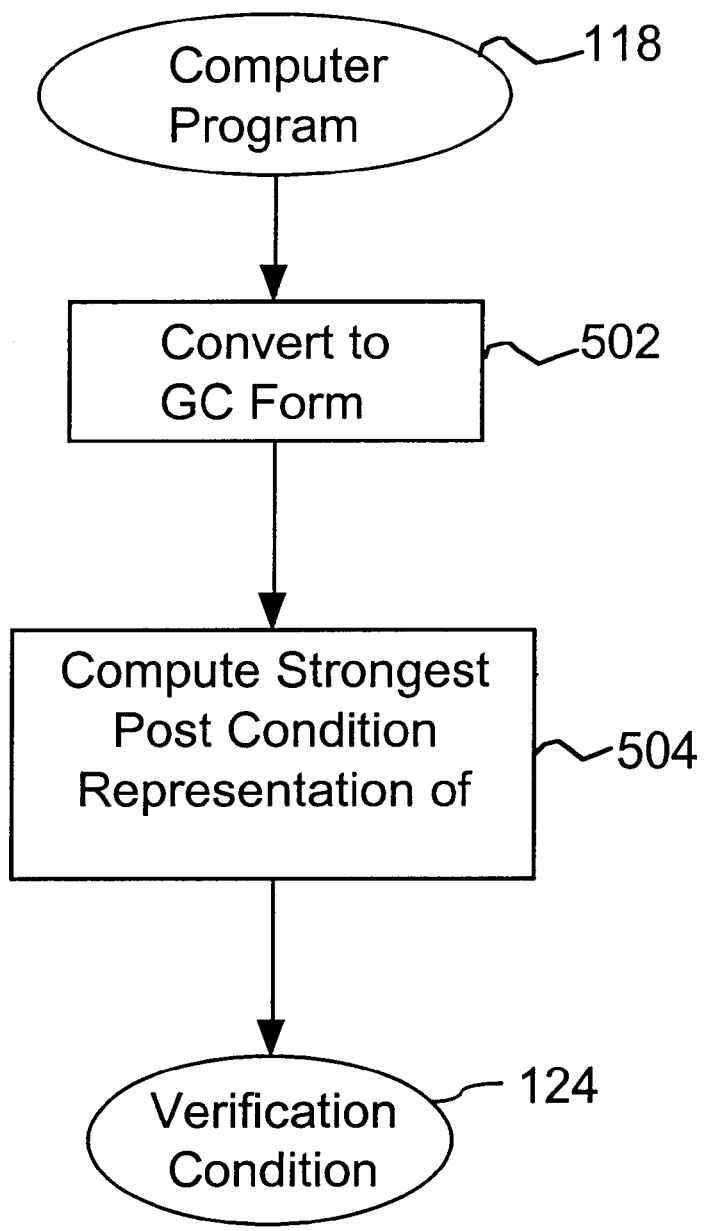
FIG. 5 is a flow chart of a method of determining whether a specified computer program satisfies a set of program conditions including a process of generating a simplified verification condition expressed as strongest post conditions according to a second embodiment of the method of the present invention.

The approach according to the present embodiment is outlined in FIG. 5. The computer program 118 is optionally converted to guarded command form, step 502, and the strongest postcondition representation of the weakest precondition is computed from the guarded command form, step 504, thereby generating a VC 124. According to this approach, it is not necessary to transform the guarded commands to passive form and there is no need to remove assignments.

According to this embodiment, labels are introduced for variables by selectively applying Eq. 1 to compute weakest preconditions instead of using the formulae of Table 2 for a traditional weakest precondition operator. Specifically, if Eq. 1 is used for subexpressions of the form ($S_1 \square S_2$) and if the prior art method is used for all other subexpressions, then this embodiment of the present invention effectively introduces the label T' for the value at the control join point after ($S_1 \square S_2$) for each target T.

The reason that equation 1 is promising for case-reduced VC generation is that it separates the occurrences of S from the occurrences of N and X, placing them on opposite sides of implications (⇒symbols). If S contains choices, then antecedents of the implications (those expressions on the left hand side of the ⇒symbol) will end up containing disjunctions, but the postconditions will not be duplicated for each arm of those disjunctions.

One convenient approach to simplifying an equation such as Equation 1 is to use the following relationship:

$$(\forall x : x = e \Rightarrow P) \equiv P_{x := e}$$

Thus, in equation 1, application of this relationship permits the factoring out of TT.

An acceptable strategy, therefore, for generating a verification condition is to use equation 1 to expand the wp of choices and to use the ordinary wp equations (Table 2) for all other operators (and also for the expression wp( . . . , True, True) on the right hand side of equation 1).

Thus, the method described herein, by which weakest preconditions are written as expressions that comprise strongest postconditions, has succeeded in avoiding the duplication (or approximate duplication) of postconditions that would result in the methods of the prior art that utilize only weakest preconditions.

A program whose weakest precondition has been computed in a manner utilizing strongest postconditions, as described hereinabove, is passed to a theorem prover to test its validity as shown in FIG. 1. Savings of resources are consequently gained by avoiding the duplication of expressions following control join points.

As would be understood by one of skill in the art, the method of transforming a computer program in guarded command form to a weakest precondition in which subexpressions separated by choice operators are expressed as strongest postconditions, is applicable to computer programs written in other guarded command forms as well as other programming languages that are not first converted to guarded command form.

EXAMPLES

Example 1

Embodiment Employing Strongest Postconditions

As an example of this strategy, suppose it is desired to compute the following weakest precondition expression of a choice expression.

$$wp((x:=5 \square x:=x+1); K, N, X)$$

wherein K is a potentially large command. By applying the ordinary weakest precondition calculation, using the rule for semi-colon, as shown hereinabove in Table 2, the value is:

$$wp((x:=5 \square x:=x+1), wp(K, N, X), X)$$

Applying the strongest postcondition expression, given above in Eq. 1, wherein S is represented by the choice expression in parenthesis, N is represented by the expression wp(K,N,X) and X is simply X, the only target of the command S is x. To apply Eq. 1, the adorned variables xx and x' are introduced. Eq. 1 then gives:

$$wp(x:=5 \square x:=x+1, \text{True}, \text{True}) \wedge (\forall xx, x': (snp((x:5 \square xx:=xx+1); x':= xx, xx=x) \Rightarrow wp(K,N,X)_{x:=x'}) \wedge (sxp((x:=5 \square xx:=xx+1); x':=xx, xx=x) \Rightarrow X_{x:=x'}))$$

Applying the ordinary weakest precondition formula (Table 2) and simple predicate calculus, the expression $$wp(x:=5 \square x:=x+1, \text{True}, \text{True})$$

simplifies to True. Also, since there are no occurrences of "raise" in the command (xx: 5$\square$xx:=xx+1); x':=xx, the application of sxp in the antecedent of the second implication reduces to False, and the implication itself reduces to True. Thus, the entire formula reduces to $$(\forall xx, x': snp((xx:=5 \square xx:=xx+1); x':=xx, xx=x) \Rightarrow wp(K,N,X)_{x:=x'})$$

Applying the rules for snp for assignment, the subexpression $$snp((xx:=5 \square xx:=xx+1); x':=xx, xx=x)$$

is simplified to $$x'=xx \wedge (xx=5 \vee xx=x+1)$$

and therefore the entire formula becomes, on application of the "one-point" rule, $$(\forall x': (x'=5 \vee x'=x+1) \Rightarrow wp(K,N,X)_{x:=x'})$$

which has effectively given the label x' to the value of the program variable x at the control join point following the command (x:=5$\square$x:=x+1). Although wp(K,N,X)$_{x:=x'}$ may be large, it is not duplicated for each arm of the nondeterministic choice. There is only one copy of this expression. Instead of substituting both 5 and x+1 separately into wp(K, N, X), it is x' that is substituted. This result is equivalent to the result of merging variables from the DSA used in the first preferred embodiment described above.

Note that if wp(K,N,X)$_{x:=x'}$ is valid for all values of x', then a theorem prover might prove the preceding verification condition without separately analyzing the case x'=5 and the case x'=x+1.

By contrast if the ordinary wp equations are used to compute the weakest precondition of S, i.e., $$wp((x:=5 \square x:=x+1); K, N, X)$$

the expression $$wp(K,N,X)_{x:=5} \wedge wp(K,N,X)_{x:=x+1}$$

is obtained, in which wp(K,N,X) is duplicated in two nearly, but not exactly, identical copies.

Example 2

Embodiment Employing Conversion to DSA and Comparison with Traditional Weakest Precondition Computation A method according to the present invention has been implemented, as part of the Extended Static Checker for Java ("ESC/Java") project. ESC/Java is a tool for finding, by static analysis, common defects in Java programs that are not normally detected until run-time, if ever (see, K. R. M. Leino, J. B. Saxe and R. Stata, "Checking Java programs via guarded commands.", in *Formal Techniques for Java*

*Programs,* Technical Report 251, Ed. B. Jacobs, et al., Fernuniversität Hagen, 1999; and K. R. M. Leino, J. B. Saxe and R. Stata, "ESC/Java user's manual," Compaq Systems Research Center Technical Note 2000-002, October 2000, available from http://research.compag.com/SRC/ publications. incorporated herein by reference). The executable object code of ESC/Java is publicly available for research and educational purposes (see Extended Static Checking web-page, Compaq Systems Research Center, http://research.compag.com/SRC/esc). It takes as input a Java program, possibly including user annotations, and produces as output a list of possible defects in the program. The annotations in the input program describe program properties such as method preconditions, method postconditions, and object invariants. These annotations allow ESC/Java to catch software defects using a modular, or method-local, analysis. During this analysis, ESC/Java verifies that the annotations are consistent with the program, and it also uses the annotations to verify that each primitive operation (such as a dereference operation, an array access, or a type cast) will not raise a run-time exception (as might happen, for example, if a dereferenced pointer is null or if an array index is out-of-bounds). To perform this analysis, ESC/Java first translates each method and its correctness property into an intermediate representation, the guarded command form, then translates the intermediate representation into a verification condition, and then uses an automatic decision procedure to determine the validity of the verification condition.

In the implementation of the present invention used in this Example, the program to be checked is converted into a passive guarded command form before the VC is generated. Thus duplicated subexpressions in the VC are exact copies (and not substitution instances) of one another. This implementation uses a cutoff K, and only names a duplicated subexpression if the subexpression is larger than K (where the size of a subexpression is the number of nodes in its representation). For any finite value of this cutoff, the size of the resulting VC is linear in the size of the passive statement, and hence at most quadratic in the size of the source program. The validity of the VC is checked with an automatic decision procedure, Simplify (see for example, Nelson, G., "Techniques for program verification," Technical Report CSL-81–10, Xerox Palo Alto Research Center, 1981).

This Example presents experimental results comparing five VC-generation options: the standard wp-based translation, and the two-stage translation based on the embodiment described hereinabove with four different values (0, 10, 30, ∞) for the cutoff size K above which to introduce names for duplicated outcome predicates.

These experiments were performed on a 667 MHz ES40 Alpha workstation containing 4 Gb of memory running Tru64 UNIX. ESC/Java is written in Java, and was run on the Compaq Fast VM. The Simplify theorem prover is written in Modula-3, and runs as a separate process. The two processes communicate via Unix pipes.

The benchmark used for these experiments is ESC/Java's front-end, which has been annotated with appropriate specifications. This front-end consists of 2292 routines (methods and constructors) totaling over 20,000 lines of code.

The routines in the benchmark have been divided into three categories according to their worst performance under any of the five options. The first category contains the ten "hardest" routines. The verification of each of these routines either exhausted a 1 Gb heap or required more than five minutes under at least one of the options. The second category of routines contains the 17 routines that required at least 100 seconds under some option, but no more than 300 seconds under any option. The third category contains the 2184 routines in the benchmark that were successfully verified in under 100 seconds regardless of the VC generation option chosen. The remaining 81 routines in the front end are routines for which ESC/Java performs no VC generation (for example, methods declared in interfaces); these routines are not included in the benchmark.

The performance of the five VC generation options on the routines in the benchmark are shown in Table 9 hereinbelow, with results for the ten "hardest" routines given individually, and summed results for the other two categories.

TABLE 9

| | | | wp translation | | Present invention using DSA | | | | | | |
|---|---|---|---|---|---|---|---|---|---|---|---|
| Routine name | AST | GC | VC | time | PGC | % | K | VC | % | time | % |
| BinaryExpr. postCheck | 420 | 1805 | too big | | 1545 | 86 | 0 | 5758 | | 1.4 | |
| | | | | | | | 10 | 4840 | | 0.6 | |
| | | | | | | | 30 | 4700 | | 0.6 | |
| | | | | | | | ∞ | 5513 | | 1.0 | |
| LiteralExpr. PostCheck | 423 | 1417 | too big | | 1608 | 113 | 0 | 5735 | | 1.5 | |
| | | | | | | | 10 | 5023 | | 1.3 | |
| | | | | | | | 30 | 5141 | | 1.3 | |
| | | | | | | | ∞ | 5765 | | 1.3 | |
| finishFloating PointLiteral | 653 | 3464 | too big | | 7927 | 229 | 0 | 13134 | | 69.5 | |
| | | | | | | | 10 | 10616 | | 8.9 | |
| | | | | | | | 30 | 10583 | | 10.7 | |
| | | | | | | | ∞ | 20416 | | 73.9 | |
| ScanCharOr String | 812 | 3896 | too big | | 23904 | 614 | 0 | 33502 | | 49.8 | |
| | | | | | | | 10 | 29851 | | 18.1 | |
| | | | | | | | 30 | 29924 | | 17.1 | |
| | | | | | | | ∞ | 51357 | | 16.3 | |
| scanNumber | 1030 | 4170 | too big | | 12383 | 297 | 0 | 19080 | | 34.6 | |
| | | | | | | | 10 | 15334 | | 23.0 | |
| | | | | | | | 30 | 15204 | | 14.6 | |
| | | | | | | | ∞ | 25093 | | 10.7 | |
| scanPunctuation | 509 | 3326 | 4751446 | 350.0 | 10457 | 314 | 0 | 15525 | 0 | 26.0 | 7 |
| | | | | | | | 10 | 13748 | 0 | 12.9 | 4 |
| | | | | | | | 30 | 13816 | 0 | 12.0 | 3 |
| | | | | | | | ∞ | 17972 | 0 | 6.8 | 2 |

TABLE 9-continued

| Routine name | AST | GC | wp translation VC | time | PGC | % | K | Present invention using DSA VC | % | time | % |
|---|---|---|---|---|---|---|---|---|---|---|---|
| parseNew Expression | 794 | 7052 | 102780 | 77.0 | 27170 | 385 | 0 | 38186 | 37 | 530.1 | 688 |
| | | | | | | | 10 | 36116 | 35 | 432.0 | 561 |
| | | | | | | | 30 | 35749 | 35 | 419.0 | 544 |
| | | | | | | | ∞ | 83659 | 81 | 339.2 | 440 |
| checkExpr | 3945 | 17448 | 2798672 | >2000.0 | 35491 | 203 | 0 | 61813 | 2 | 750.4 | <30 |
| | | | | | | | 10 | 53779 | 2 | 401.5 | <16 |
| | | | | | | | 30 | 51874 | 2 | 347.8 | <14 |
| | | | | | | | ∞ | 90646 | 3 | 169.4 | <7 |
| checkStmt | 2883 | 15746 | 1041210 | 309.0 | 43417 | 276 | 0 | 67915 | 7 | 457.5 | 148 |
| | | | | | | | 10 | 61352 | 6 | 251.1 | 81 |
| | | | | | | | 30 | 57726 | 6 | 145.4 | 47 |
| | | | | | | | ∞ | 105297 | 10 | 151.9 | 49 |
| visitMethodDecl | 479 | 4331 | 2022351 | 381.5 | 5270 | 122 | 0 | 12423 | 1 | 10.2 | 3 |
| | | | | | | | 10 | 11430 | 1 | 8.7 | 2 |
| | | | | | | | 30 | 11581 | 1 | 8.7 | 2 |
| | | | | | | | ∞ | 12544 | 1 | 8.8 | 2 |
| sum of 17 other routine needing >100 seconds in some rum | 14735 | 124511 | 11782617 | 1574.5 | 312822 | 251 | 0 | 489529 | 4 | 1777.8 | 113 |
| | | | | | | | 10 | 461027 | 4 | 1048.0 | 67 |
| | | | | | | | 30 | 450090 | 4 | 900.7 | 57 |
| | | | | | | | ∞ | 955276 | 8 | 676.8 | 43 |
| sum of remaining 2184 routines | 148168 | 1851166 | 11668371 | 1613.4 | 2379973 | 129 | 0 | 7471786 | 64 | 2473.1 | 153 |
| | | | | | | | 10 | 7095724 | 61 | 1662.8 | 103 |
| | | | | | | | 30 | 6998342 | 60 | 1508.5 | 93 |
| | | | | | | | ∞ | 7530778 | 65 | 1564.1 | 97 |

The columns of Table 9 identify:

the routine name (or summed category);

the size of the abstract syntax tree for the routine (number of nodes);

the size of the guarded command (number of nodes);

the size of the VC under the wp translation (number of nodes);

the time required to check this routine under the wp translation (seconds);

the size of the passive version of the guarded command (number of nodes and percentage of original guarded command);

the cutoff K for naming duplicated outcome predicates (number of nodes);

the size of the VC under the two-stage translation (number of nodes and percentage of the wp VC); and the time required to verify this routine under the two-stage translation (seconds and percentage of time using wp).

The times in Table 9 include the time required to translate the Java abstract syntax tree representation into a guarded command, the time required to translate the guarded command into a VC (including translation into the intermediate passive representation, if necessary), and time required to check the VC. For the summed categories, the entries in the percentage columns tell how big one summed quantity is as a percentage of another.

The results indicate that all the VC generation algorithms work well on the simpler routines in the third category. The two-stage translation produces smaller VC's that are slightly easier to prove for K=30 or K=∞. Choosing K=0 results in the theorem prover performing significant extra work to process the resulting indirections.

The wp translation has difficulty scaling to the larger or more complex routines; for five of the routines in this benchmark the wp translation exhausted a 1 Gb heap limit.

The two-stage translation involving passive guarded commands performs much better on these complex routines; the resulting VC's are significantly smaller, and can easily fit in the heap. Again, choosing K=0 results in larger proof times.

For K>0, the two-stage translation yields VC's that require significantly less time to prove (sometimes by an order of magnitude) than the VC's produced by the wp translation.

The routine "parseNewExpression" requires significantly more time to verify under the two-stage translation than under wp. In general, the time required by Simplify to verify a formula is highly dependent on the order in which Simplify chooses to perform various case-splits, and the case-split order is determined by a variety of heuristics. For this routine, we suspect that these heuristics are misled in some manner by the VC generated by the two-stage translation.

Overall, the two-stage translation via passive guarded commands performs significantly better than the direct wp translation. It enables ESC/Java to check all of the routines in this benchmark due to the smaller space requirements, and is significantly faster. Excluding the six routines that could not be checked using the wp translation, checking the entire benchmark using wp required 4305 seconds, whereas using the two-stage translation requires only 2994 seconds (for K=30), or 2748 seconds (for K=∞).

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product, or a computer readable medium, that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of generating a verification condition for a computer program that comprises a collection of program statements and that contains a pair of conditional program execution paths preceding a control join point and an expression following the control join point, the method comprising:

applying at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

2. The method of claim 1, wherein said at least one precondition operator is a weakest precondition operator computed by at least one strongest postcondition operator.

3. The method of claim 2, wherein said weakest precondition operator is expressed as a combination of strongest postcondition operators, snp and sxp.

4. The method of claim 2 wherein said weakest precondition operator for a subexpression S is expressed as:

$$wp(S, N, X) = wp(S, \text{True}, \text{True}) \wedge (\forall TT, T': (snp(S_{T:=TT}; T':=TT, TT=T) \rightarrow N_{T:=T}) \wedge (sxp(S_{T:=TT}!(T':=TT; \text{raise}), TT=T) \rightarrow X_{T:=T}))$$

wherein T, TT and T' are lists of variables that are assigned values in S and wherein N is a normal postcondition and X is an exceptional postcondition.

5. The method of claim 4 wherein said weakest precondition operator is applied to program statements that include a choice operator and wherein a traditional weakest precondition operator is applied to other program statements.

6. The method of claim 5 wherein at least one program statement raises an exception.

7. The method of claim 2 wherein said weakest precondition operator for a subexpression S is expressed as:

$$wp(S, N) = wp(S, \text{True}) \wedge (\forall TT, T': (sp(S_{T:=TT}; T':=TT, TT=T) \rightarrow N_{T:=T}))$$

wherein T, TT and T' are lists of variables that are assigned values in S and wherein N is a normal postcondition.

8. The method of claim 7 wherein said weakest precondition operator is applied to program statements that include a choice operator and wherein a traditional weakest precondition operator is applied to other program statements.

9. The method of claim 2 additionally comprising, prior to applying said at least one precondition operator, converting said computer program to an intermediate form.

10. The method of claim 9 wherein said intermediate form is a guarded command form.

11. The method of claim 1 additionally comprising:

passing the verification condition to a theorem prover and determining whether or not the verification condition is valid.

12. The method of claim 11 wherein said theorem prover generates at least one counter-example, if the truth of the verification condition cannot be proved.

13. The method of claim 12 additionally comprising:

analyzing said at least one counter-example and producing an error message.

14. A computer readable medium for use in conjunction with a computer system, the computer readable medium comprising a computer readable storage medium and a computer program mechanism embedded therein, the computer program mechanism comprising:

instructions for generating a verification condition for a computer program that comprises a collection of program statements and that contains a pair of conditional program execution paths preceding a control join point and an expression following the control join point;

instructions for applying at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

15. The computer readable medium of claim 14, further comprising instructions for computing said at least one precondition operator in terms of a weakest precondition operator expressed as at least one strongest postcondition operator.

16. The computer readable medium of claim 14 additionally comprising instructions for converting said computer program into an intermediate form.

17. The computer readable medium of claim 16 additionally comprising instructions for converting said computer program into a guarded command form.

18. The computer readable medium of claim 14 additionally comprising instructions for passing the verification condition to a theorem prover and determining whether or not the verification condition is valid.

19. An apparatus for generating a verification condition for a computer program that comprises a collection of program statements and that contains a pair of conditional program execution paths preceding a control join point and an expression following the control join point, the apparatus comprising:

a memory containing the computer program, an operating system and at least one processor configured to execute mathematical operations on the computer program, wherein said computer processor:

applies at least one precondition operator to the computer program to produce a verification condition which includes a single instance of a subexpression derived from the expression following the control join point, wherein, while applying the at least one precondition operator to the computer program, a label is given to a value, at the control join point, of a variable that is modified on at least one of the conditional program execution paths.

20. The apparatus of claim 19, wherein said computer processor additionally computes said at least one precondition operator in terms of a weakest precondition operator expressed as at least one strongest postcondition operator.

21. The apparatus of claim 19, wherein said computer processor additionally converts said computer program into an intermediate form.

22. The apparatus of claim 19, wherein said computer processor additionally converts said computer program into a guarded command form.

23. The apparatus of claim 19, wherein said computer processor additionally passes the verification condition to a theorem prover and determining whether or not the verification condition is valid.

* * * * *

UNITED STATES PATENT AND TRADEMARK OFFICE
CERTIFICATE OF CORRECTION

PATENT NO. : 6,553,362 B2  Page 1 of 1
APPLICATION NO. : 09/907327
DATED : April 22, 2003
INVENTOR(S) : Saxe et al.

It is certified that error appears in the above-identified patent and that said Letters Patent is hereby corrected as shown below:

Column 31, Claim 4, Line 25, After the first occurrence of "TT,T" insert --'--

Column 31, Claim 4, Line 26, After subscript "T:=T" insert --'--

Column 31, Claim 7, Line 40, After the first occurrence of "TT,T" insert --'--

Column 31, Claim 7, Line 41, After subscript "T:=T" insert --'--

Signed and Sealed this

Twenty-fourth Day of November, 2009

David J. Kappos
*Director of the United States Patent and Trademark Office*